United States Patent [19]
Burnworth et al.

[11] Patent Number: 5,793,620
[45] Date of Patent: Aug. 11, 1998

[54] COMPUTER EXTENSION BOARD CONNECTED TO AN EXPANSION BOARD

[75] Inventors: Randy J. Burnworth, San Diego, Calif.; Kenneth C. Tate, Bellingham, Wash.

[73] Assignee: RAVE Engineering, San Diego, Calif.

[21] Appl. No.: 613,595

[22] Filed: Mar. 12, 1996

[51] Int. Cl.$^6$ ............................................. H05K 9/00
[52] U.S. Cl. ........................... 361/818; 361/816; 361/800; 361/748; 439/945
[58] Field of Search ............................ 361/748, 752, 361/761, 796, 807, 686, 810, 816, 818, 760; 174/35 GC, 35 R, 51, 50.52, 35 MS, 35 TS; 439/59, 60, 61, 945

[56] References Cited

U.S. PATENT DOCUMENTS

| | | | |
|---|---|---|---|
| 2,951,185 | 8/1960 | Buck | 439/945 |
| 4,744,006 | 5/1988 | Duffield | 361/686 |
| 5,344,340 | 9/1994 | Bouleau | 439/581 |
| 5,411,416 | 5/1995 | Balon et al. | 439/639 |

*Primary Examiner*—Leo P. Picard
*Assistant Examiner*—Anthony Dinkins
*Attorney, Agent, or Firm*—Robert D. Varitz

[57] ABSTRACT

A circuit board assembly is intended for use in a computer, which computer includes a case, a motherboard, a power supply and at least one expansion slot. The circuit board assembly includes an expansion card which is operatively connected to the expansion slot and includes a connector carried on one end thereof. The end of the expansion card having the connector is located adjacent the periphery of the computer case. An extension circuit board is provided and is constructed and arranged to operatively mate with the connector on the expansion card. The extension circuit board extends beyond the periphery of the computer case, and may include multiple ports thereon for connecting peripheral devices to the computer. The extension circuit board is contained within an RF shielding container and is secured to the computer.

16 Claims, 1 Drawing Sheet

5,793,620

COMPUTER EXTENSION BOARD CONNECTED TO AN EXPANSION BOARD

FIELD OF THE INVENTION

The invention relates to electronic hardware, and specifically to a circuit board assembly which may be installed in an expansion slot, which includes an extension circuit board for providing connection to a number of peripheral devices. More specifically, the invention relates to an expansion card for use in a computer, and an extension circuit board which is connected thereto for providing connection to a number of computer peripheral devices.

BACKGROUND OF THE INVENTION

Electronic products are frequently constructed so that they may be connected to other electronic or electro-mechanical devices. Audio-visual products and computers are two types of such products. The invention described herein is primarily intended for use with computers, however, it should be appreciated by those of skill in the art that the invention may also be used in connection with other electronic products.

Computers are manufactured with a system board, also referred to as a motherboard, that includes the basic electronic components which provide the processing capabilities of the computer. A motherboard may include a number of expansion slots, which allow the insertion of expansion cards thereinto, which expansion cards may be configured with connectors thereon, which may be connected to peripheral devices, which connectors are accessible from the outside of the computer case. Expansion cards are frequently provided to provide control for a video display unit, such as a color monitor, for controlling external floppy or hard drives, tape backup drives, or providing a variety of serial or parallel interface ports for communications or printers.

One end of an expansion card, when it is plugged into an expansion slot, is generally positioned adjacent to the computer case. This positioning allows the expansion card to be structurally connected to the frame of the computer for stability and, if the expansion card is used to provide input/output capabilities for the computer, to provide an external connector, or port, which protrudes through an opening, or slot, in the frame of the computer. This allows a peripheral device to be connected to an external port on the expansion card. Computer cases are generally metallic in composition, to provide shielding against the electromagnetic RF signals generated by the personal computer, and to also protect the computer components from external electromagnetic/RF noise.

As computers have grown more complex, and particularly as personal computers have been developed with increased processing capabilities, there has been a need to provide connection amongst multiple personal computers, generally in the form of a local area network (LAN) which enables a number of personal computers to be connected together, to communicate with one another, and to share peripheral devices, such as modems, CD-ROM drives, back up facilities and hard drives. Most expansion cards, however, have a limited number of connectors available on the portion thereof accessible from outside of the computer case. In the situation where a computer is used as a LAN file server, or in the case of peripherals which require many I/O connections, the number of desired connectors may exceed the space that is available on the connection portion of an expansion card.

One known solution to this problem is disclosed in U.S. Pat. No. 4,744,006 to Duffield, wherein an expansion card is constructed so that is contains a larger number of connectors thereon than is possible with a convention expansion card that is fully received within a computer case. Duffield provides a card which has an extended interface thereon, which card must be inserted from the back side of the computer, through the slot in the computer card. The expansion card and the extension thereof are a single piece. It is believed that the extension portion of the card is susceptible to breakage in the event that the computer is moved, or bumped. Additionally, only those connectors which are initially installed on the expansion board may be used with a particular expansion board.

SUMMARY OF THE INVENTION

The circuit board assembly of the invention is intended for use in a computer, which computer includes a case, a motherboard, a power supply and at least one expansion slot. The circuit board assembly includes an expansion card which is operatively connected to the expansion slot and includes a connector carried on one end thereof. The end of the expansion card having the connector is located adjacent the periphery of the computer case. An extension circuit board is provided and is constructed and arranged to operatively mate with the connector on the expansion card. The extension circuit board extends beyond the periphery of the computer case, and may include multiple ports thereon for connecting peripheral devices to the computer. The extension circuit board is contained within an RF shielding container and is secured to the computer.

An object of the invention is to provide a circuit board assembly which allows the provision of multiple ports thereon for connecting peripheral devices to the computer.

Another object of the invention is to provide an extension circuit board, which will plug into an expansion card, and which extends beyond the periphery of the computer case.

A further object of the invention is to provide an extension circuit board which has an impedance-matching circuit, to provide a desired low impedance at an I/O interface.

Yet another object of the invention it to provide an extension card which is not subject to the size limitations dictated by the size of a computer case.

These and other objects and advantages of the invention will become more fully apparent as the description which follows is read in conjunction with the drawings.

BEST MODE OF PRACTICING THE INVENTION

Figure 1:
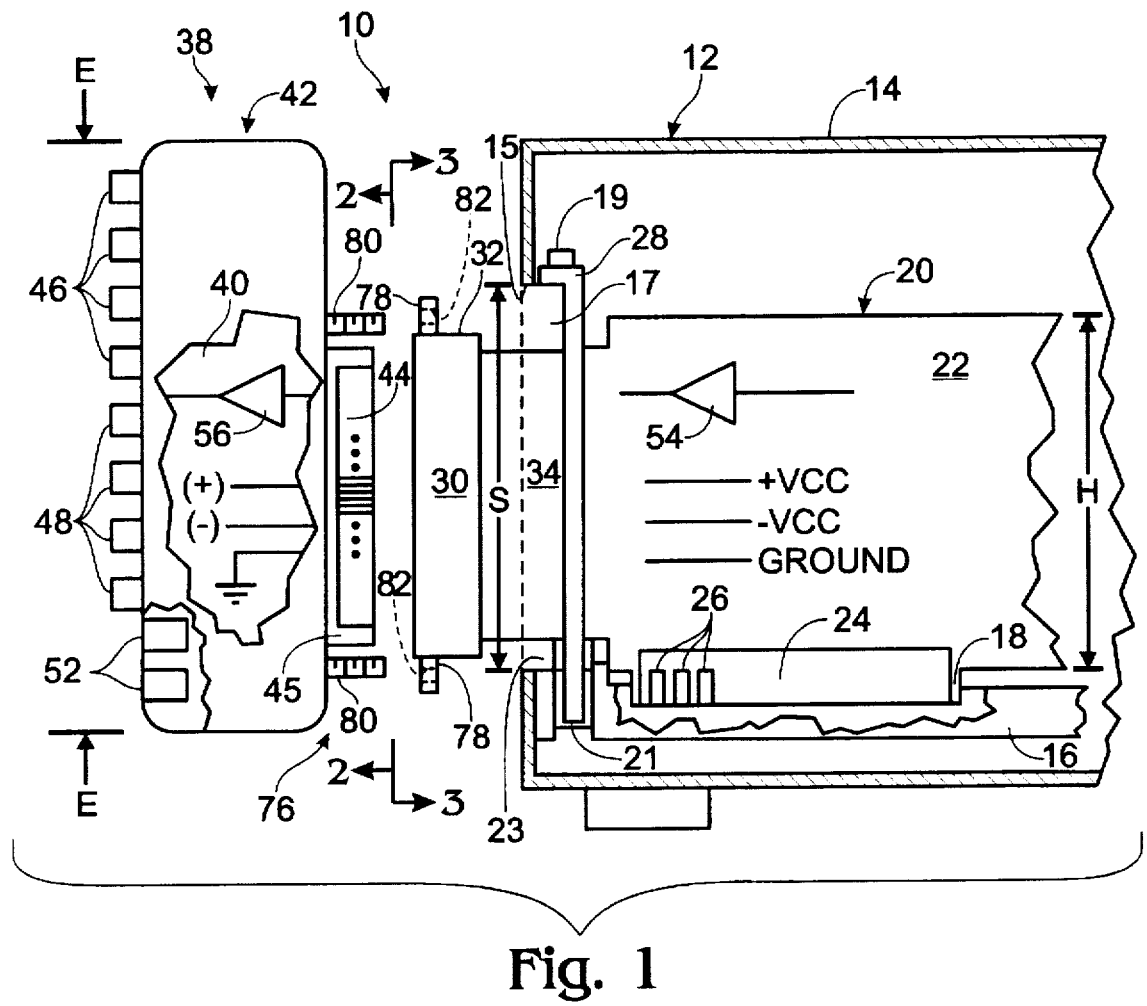
FIG. 1 is side elevation of the circuit board assembly of the invention.
Figures 2, 3, 4:
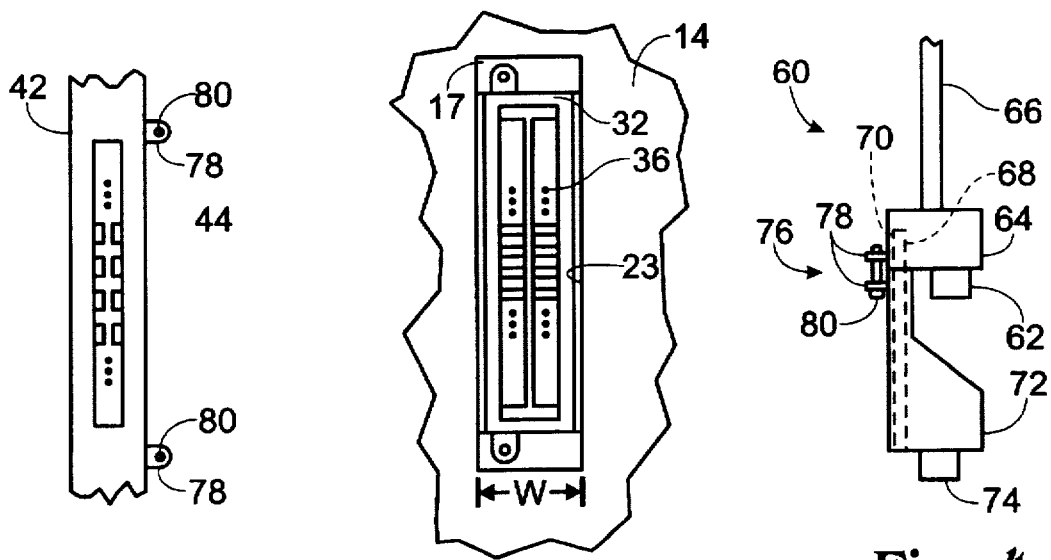
FIG. 2 is a rear elevation of an extension circuit board of the invention, taken generally along the line 2—2 of FIG. 1.
FIG. 3 is a front elevation of a circuit board connector of the invention, taken generally along the line 3—3 of FIG. 1.
FIG. 4 is a top plan view of a modified form of the extension circuit board of the invention.

Turning now to the drawings, and referring initially to FIGS. 1–3, a circuit board assembly of the invention is depicted generally at 10. Circuit board assembly 10 is mounted in a computer 12 which includes a computer case 14, and a motherboard 16 having an expansion slot 18 therein. Computer 12 also includes a power supply (not shown).

Circuit board assembly 10 includes an expansion card, also referred to herein as an expansion circuit board, or as an expansion board, 20, which includes a printed circuit board (PCB) 22, having a variety of components (not shown) mounted thereon, and having a strip connector 24 integrally formed therewith. Strip connector 24 includes a number of metallic contacts, which are represented by contacts 26, which are spaced along the length of strip connector 24, and which provide an electrical connection between expansion slot 18 and expansion card 20. Expansion card 20 also includes a mounting strip 28, which is formed of metal, and which secures expansion card 20 into computer 12, while also providing RF shielding to/from the computer. Computer 12 includes an opening 15 in the rear of case 14. An expansion card mounting structure 17 is located adjacent opening 15 and provides a mechanism for securing expansion cards in the computer, generally by means of a screw 19, which extends through one end of mounting strip 28 into mounting structure 17. A mounting-strip receiving slot 21 is located at the base of mounting structure 17 and receives the other end of mounting strip 28. Mounting structure 17 has a number of openings, such as opening 23 (FIG. 3) therein. Each opening is of a width W.

An external portion 34 of expansion card 20 may be provided, which extends beyond the periphery of case 14, and terminates in a first board connector, or first connector element, depicted generally at 30. If external portion 34 extends beyond the margins of case 14, suitable RF shielding may be required about external portion 34.

First board connector 30 includes a receptacle element 32, which is depicted in FIG. 3, and which has plural electrical contacts therein, shown at 36. Connector 30 is mounted on external portion 34 of printed circuit board 22, or may be mounted on PCB 22 immediately adjacent mounting strip 28. In either configuration, connector 30 is located externally of computer case 14, adjacent the periphery of case 14, beyond mounting structure 17. Receptacle 32 and extended portion 34 are both substantially enclosed by suitable RF shielding material, such as a metal enclosure, with the exception of the mating portions thereof. Electrical contacts 36 are similar in construction to strip connector 24. In the preferred embodiment, receptacle 32 is a female receptacle having plural electrical contacts 36 located therein.

An extension circuit board is depicted generally at 38. Extension circuit board 38 includes a printed circuit board 40, which is encased in a metal, RF shielding container 42. Extension circuit board 38 includes a strip connector 44, which is operably electrically conformal with plural electrical contacts 36. Extension circuit board 38, in the preferred embodiment, has a male plug element, or second connector element, 45 which carries strip connector 44. When the extension circuit board is plugged into the expansion card, both PCB are fully encased by suitable RF shielding.

One use for extension circuit board 38 is to provide multiple connectors to enable the connection of a variety of peripheral devices to the electronic device on which the extension circuit board is mounted. Connection ports are depicted at 46, 48, 50 and 52. Ports 46 through 52 may be of the same type, or they may be of different types, i.e., 46–50 may be of the RCA, RF or BNC type connectors, or may take the form of serial or parallel connectors. 52 represents an RJ11 jack, as might be used for LAN or modem connection. Connectors 46, 48, 50 and 52 may be mounted on PCB 40 using conventional mounting techniques, or they may be mounted using the connector pad described and claimed in co-pending application for UNIVERSAL CONNECTOR PAD, Ser. No. 08/613,289, filed Mar. 11, 1996.

As will be apparent to those of skill in the art, the circuit board assembly described herein may be used with any form of electronic equipment that requires connector expansion, or "fan out", and/or requires such connectors to have a specific impedance.

Radio frequency and video signals require low impedance cables and connectors of 50 ohms and 75 ohms, respectively, to prevent standing wave artifacts. A connector which is specifically designed to meet this specification must be used, or the signal will be corrupted, and may interfere with other devices. Multi-pin connectors, such as those used between the mother board and the expansion card, require an impedance of 1000 ohms or greater. Significant signal degradation will occur if an output signal is connected to a low-impedance connector without an active impedance matching circuit.

One of the features of circuit board assembly 10 is the provision of an impedance matching circuit, which includes a first impedance matching element 54, located on PCB 22, and a second impedance matching element 56, located on PCB 40. Signals which are found on, or pass through, PCB 22 are generally high impedance signals, generally 1000+ ohms. Ideally, the signals which go to the external ports on an expansion card are low impedance signals, generally <100 ohms, and which are transmitted through connectors and/or cables. Ports 46 through 52 on extension circuit board 38 are of the low impedance variety. To this end, in the preferred embodiment, a pair of active circuit devices, or op amps are provided as the first and second impedance matching elements, which are operative to match the impedance to the desired type of port. Impedance matching element are provided to insure that a specific connector on extension circuit board 38 will have the proper impedance. To this end, the impedance matching circuit may have multiple active circuit devices. Assembly 10 may be constructed so that a selected extension board, which is one of a variety of extensions board configurations, each having different connector configurations, may be plugged into a single expansion card, depending on the needs of the user. It is conceivable that a computer manufacturer might include one or more expansions cards constructed according to the invention in a computer, and allow the user to plug an appropriate extension board, having the proper connectors thereon, into the computer, thus eliminating the need to remove the case from the computer.

As is also shown in FIG. 1, power and grounding components for any peripheral devices are depicted generally at 58 on PCB 22, and are connected through the connector elements to extension circuit board 38.

Many computer users also perform routine maintenance on their computers, including the installation of upgraded hardware components. The circuit board assembly of the invention is particularly well suited for installation by a user, and, once a proper expansion card is installed, allows a user to install or switch extension circuit boards at will, without the need to open the computer case.

A modified form of the circuit board assembly of the invention is depicted in FIG. 4, generally at 60. In this instance, a number of ports, depicted at 62, may be present on the first connector element 64 of a printed circuit board, or expansion card, 66. A receptacle 68 is located along side of ports 62, and receives a strip connector 70 of an extension circuit board 72, which has additional ports 74 thereon. Again, suitable RF shielding is provided for connector 64 and extension circuit board 72, as is the impedance matching circuitry.

Returning momentarily to FIG. 1, a fastening mechanism is depicted generally at 76. Fastening mechanism 76 includes dogs 78, located along the side of RF shielding container 42, and screw-type fasteners 80, which extend through dogs 78 and into threaded bores 82 in dogs 78 located on first connector element 30. A similar fastening mechanism may be provided for the embodiment of the extension circuit board shown in FIG. 4.

One of the advantages of the construction of the circuit board assembly of the invention is that, while expansion card 20 is restricted to having a predetermined height H, which will fit within the confines of case 14, extension circuit board 38 may have a height E, which is greater than height H, to accommodate multiple ports thereon. Additionally, the height S of a slot 23 in case 14 will accommodate passage of a computer component having a height of <S. Extension circuit board 38 is not restricted to the limitation of height S. Likewise, the slot 23 has a predetermined width W, which is a limitation on the width of any component which is able to pass through the slot. Again, extension circuit board 38 is not subject to this width limitation, and may have a width >W.

Although a preferred embodiment of the invention, and a variation thereto have been disclosed herein, it should be appreciated that further variations and modifications may be made thereto without departing from the scope of the invention as defined in the appended claims.

We claim:

1. A circuit board assembly for use in a computer, wherein the computer includes a case, a motherboard, a power supply and at least one expansion slot, comprising:

an expansion board adapted to be mounted in the expansion slot, said expansion board having a first board connector carried on one end thereof, wherein said one end is located adjacent the periphery of the computer case; and an extension circuit board having a second board connector thereon, adapted to be mounted in said first board connector, operatively mating with said first board connector, wherein said extension circuit board extends beyond the periphery of the computer case.

2. The circuit board assembly of claim 1 wherein said first board connector includes a female receptacle element having plural electrical contacts therein, and wherein said second board connector includes a male plug element which is physically and electrically conformal to said female receptacle.

3. The circuit board assembly of claim 1 which further includes an RF shielding container.

4. The circuit board assembly of claim 3 wherein said extension circuit board is substantially enclosed within said RF shielding container.

5. The circuit board assembly of claim 1 which further includes an impedance matching circuit, wherein a first impedance matching element is located on said expansion board and wherein a second impedance matching element is located on said extension circuit board.

6. The circuit board assembly of claim 1 wherein said extension circuit board includes multiple ports thereon for connecting peripheral devices to the computer.

7. A circuit board assembly for use in a computer, wherein the computer includes a case, a motherboard, a power supply and at least one expansion slot, for providing a multiplicity of connection ports to the computer, comprising:

an expansion circuit board electrically connected to the expansion slot, said expansion circuit board having first connector element carried on one end thereof, wherein said one end extends beyond the computer case;

an extension circuit board having a second connector element and a multiplicity of connection ports connected thereto, wherein said second connector element is constructed and arranged to operatively mate with said first connector element; and an impedance matching circuit, wherein a first impedance matching element is located on said expansion circuit board and wherein a second impedance matching element is located on said extension circuit board.

8. The circuit board assembly of claim 7 which further includes an RF shielding structure, and wherein said extension circuit board is substantially enclosed within said RF shielding structure.

9. The circuit board assembly of claim 7 wherein said first impedance matching element includes an active circuit for transmitting a high impedance signal from said expansion circuit board to said extension circuit board, and wherein said second impedance matching element includes an active circuit for taking said high impedance signal and converting same to a low impedance signal.

10. A circuit board assembly for use in a computer, wherein the computer includes a case, a motherboard, a power supply and at least one expansion slot, for providing a multiplicity of connection ports to the computer, comprising:

an expansion circuit board electrically connected to the expansion slot, said expansion circuit board having a first connector element carried on one end thereof, wherein said one end extends beyond the computer case, said expansion circuit board having a first impedance matching element thereon;

an extension circuit board, having a multiplicity of connection ports carried thereon, and having a second connector element carried thereon, which second connector element is adapted to be mounted in said first connector element, operatively mating with said expansion circuit board, said extension circuit board having a second impedance matching element thereon;

wherein said first impedance matching element includes an active circuit for transmitting a high impedance signal from said expansion board to said extension circuit board, and wherein said second impedance matching element includes an active circuit for taking said high impedance signal and converting same to a low impedance signal.

11. The circuit board assembly of claim 10 wherein said first connector element includes a female receptacle element having plural electrical contacts therein, and wherein said second connector element includes a male plug which is physically and electrically conformal to said female receptacle.

12. The circuit board assembly of claim 10 which further includes an RF shielding container and wherein said extension circuit board is substantially enclosed within said RF shielding container.

13. The circuit board assembly of claim 12 which further includes a fastening mechanism for removably securing said extension circuit board to said expansion circuit board.

14. The circuit board assembly of claim 13 wherein said fastening mechanism extends between said RF shielding container and said expansion circuit board.

15. The circuit board assembly of claim 10 wherein said expansion circuit board has a predetermined height for receipt within the confines of the computer case, and wherein said extension circuit board has a height greater than the height of said expansion board.

16. The circuit board assembly of claim 10 wherein the computer case has an opening having a predetermined width, said expansion circuit board has a mounting plate conformal with said predetermined width, and said extension circuit board has a width greater than said predetermined width.

* * * * *